Dec. 15, 1964

J. C. NEITZEL ETAL 3,160,922

GIN OVERLOAD ALARM

Filed July 26, 1962

Joseph C. Neitzel
James A. Nelson
INVENTORS

BY Bertram A. Mann

ATTORNEY

Joseph C. Neitzel
James A. Nelson
INVENTORS 3,160,922
GIN OVERLOAD ALARM
Joseph C. Neitzel and James A. Nelson, Dallas, Tex., assignors to The Murray Company of Texas, Inc., Dallas, Tex., a corporation of Delaware
Filed July 26, 1962, Ser. No. 212,697
3 Claims. (Cl. 19—55)

This invention relates to the ginning of cotton and, particularly, to means for automatically rendering the gin stand inoperative and signalling the same, upon subjection of the gin and its powering means to an overload.

In the usual gin plant, a battery of three or more gin and feeder combinations operate simultaneously, each combination being powered by an electric motor. The seed cotton drops into the gin or huller front from the feeder and thence is directed against the ginning saw teeth. The saws carry the seed cotton between the huller ribs into the seed roll chamber where a body of mixed seed and seed cotton rotates for continuous recontact with the saw teeth and transport to the ginning points against the ginning ribs where the seed, ultimately, is stripped from the lint. The cleaned seed discharges downwardly between the saws and the two sets of ribs, while the cleaned lint is carried beyond the ginning ribs and doffed.

Occasionally a condition exists wherein matted wads or tags of cotton, such as so-called spindle twists, resulting from machine harvesting of cotton, enter the gin stand and are carried to the ginning points where they collect between the ginning ribs. In such case, the corresponding portions of seed roll may cease to rotate and the ginning rate is correspondingly reduced. However, the incoming cotton continues to enter the pin front causing congestion in the seed roll which may cause excessive friction against and heating of the saws. This, in turn, may result in loss of temper of the saw blades and cause the blades to strike against the ginning ribs with resultant damage to the machine. Down time and maintenance expense result.

The gin stand, usually, is provided with means, either manual or powered, for shifting the gin or huller front, including the feed chute and seed roll chamber, away from the ginning saws, when the operator determines that blockage or other malfunction exists. While there have been some suggestions for automatically detecting malfunctioning in the seed roll chamber, such suggestions have not resulted in fully satisfactory automatic gin front control and warning systems.

Accordingly, an object of the present invention is to provide thoroughly reliable means for sensing malfunctioning in the gin, such as blockage in the seed roll chamber, and causing automatic shifting of the gin front away from the ginning position when such malfunction exists.

Another object is to provide automatic means sensitive to overloading of the gin driving motor for opening the gin front and, thereby, stopping the feeding of cotton to the gin saws.

Another object is to provide means for readily indicating which gin stand is at fault.

Still another object is to provide automatic means for opening the gin front in response to a malfunction together with manual means actuable only by the operator for returning the front to ginning position.

According to the present invention, electrical actuating means for the gin front is energized through circuitry including the gin and feeder powering means. When such powering means is subjected to an overload for any reason, as congestion in the seed roll or bearing trouble, the increase in current thereby drawn is utilized to energize the gin front opening motor and, at the same time, provide a signal indicating the particular gin affected. The gin front actuating motor is energized through a latching relay such that after the gin front is opened, it can be closed only by the closing of a manual switch, presumably, after the malfunction has been cured. In the accompanying drawings which illustrate the invention, FIG. 1 is a vertical transverse section illustrating the working parts of a commercial gin stand.

Figure 1:
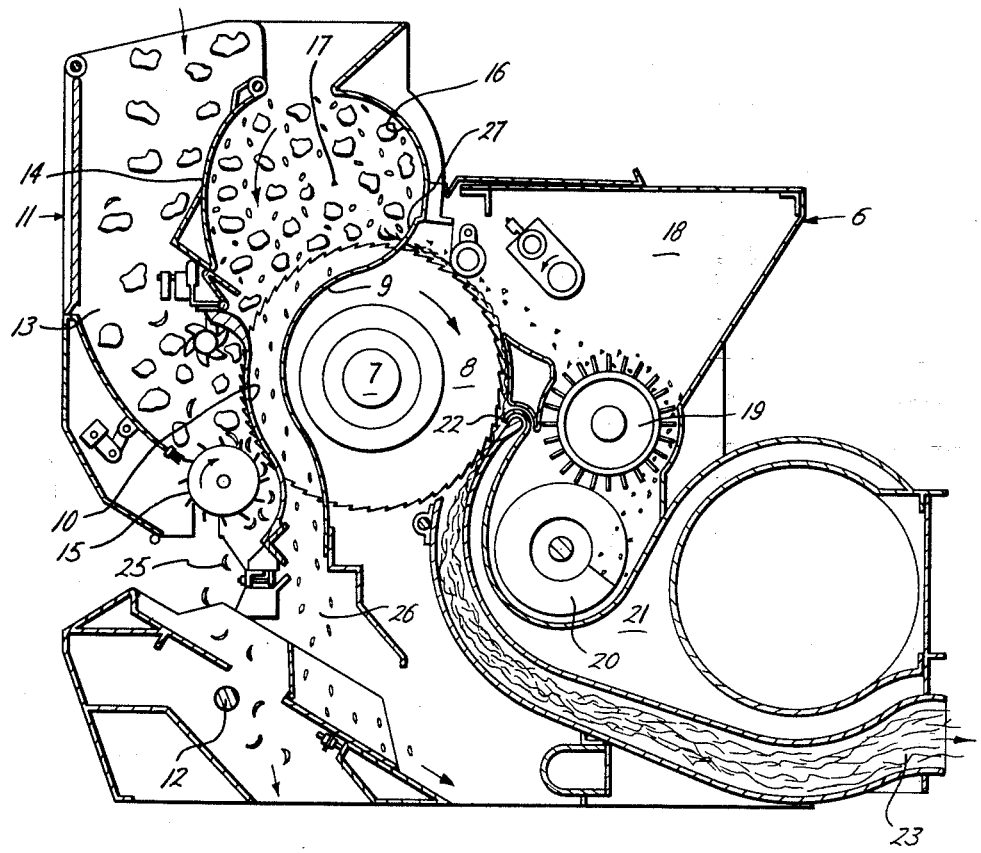

FIG. 1 shows the details of a gin stand, including a main housing part 6 which is traversed by a shaft 7 carrying a ginning cylinder with spaced saws 8. Extending between the saws and leftwardly of shaft 7 are ginning ribs 9 which are spaced slightly from the saws so as to admit lint therebetween while trapping seeds. Leftwardly of ginning ribs 9 are the somewhat more widely spaced huller ribs 10. At the front of the gin is the huller or gin front, generally designated 11, which pivots about a shaft 12 in the lower part of the gin stand. At the bottom of the chute 13, defined by the front wall of the huller front and outer scroll sheet 14, is the picker roller 15 which directs the incoming seed cotton against the ginning saw teeth. Rightwardly of the outer scroll sheet is the inner scroll sheet 16, the two scroll sheets defining therebetween the seed roll chamber 17. At the rear of the gin casing is the mote chamber 18 in the lower part of which there is provided the roller 19 for directing moting to the conveyor screw 20. Air supplied through a conduit 21 passes through an elongated nozzle 22 for doffing lint from the saws and conducting the same through the discharge flue 23.

Figure 2:
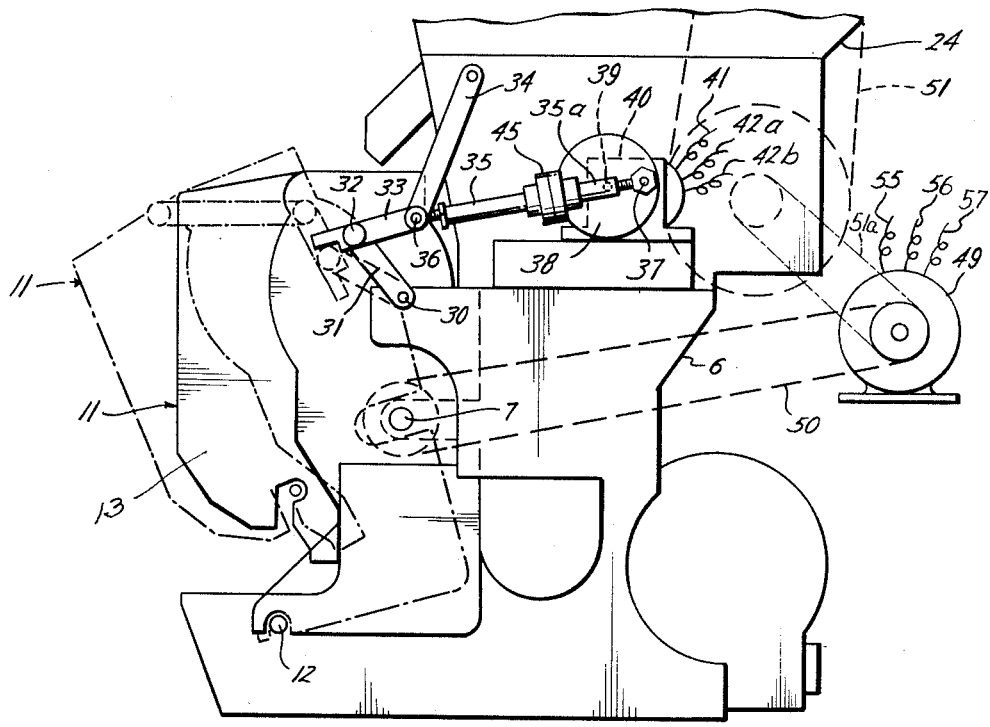
FIG. 2 is a side view of the gin stand and showing the gin front operating parts.

When the gin stand is in operation, seed cotton will be supplied from the feeder, designated in part as 24 in FIG. 2, to feed chute 13, whence it is drawn by the saw teeth through huller ribs 10 and carried to the ginning points against the ginning ribs. Hulls and trash are dropped in front of the huller ribs, as at 25. Seeds are dropped between the sets of ribs, as at 26. Lint freed from seeds is carried between the ginning ribs at ginning points 27, thence is moted and doffed as will be apparent. However, a mixture of seed cotton and seeds will accumulate within roll chamber 17 and there is caused to rotate in counterclockwise direction repeatedly bringing this accumulated mass into contact with the saw teeth. During normal operation, the cotton and seed mass in chamber 17 will rotate at a uniform rate and will remain under a uniform degree of compaction. However, in case of blocking for any reason at the ginning points 27, rotation of a part of the seed roll will slow down or stop and compaction of the roll mass will increase. This, in turn, will cause frictional heating of the saws with the danger of loss of temper, as mentioned above.

FIG. 2 illustrates the means for shifting the gin front into and away from its operative position for beginning and stopping the ginning operation. The gin front 11 is illustrated in solid lines in its closed or operating position and in dot-dash lines in its open or non-operating position. Similar front operating linkages are provided at each end of the gin stand and, therefore, only one of these will be illustrated. Pivoting on the shaft 30 mounted in the stationary framing of the gin stand is an arm 31 to the outer end of which there is pinned at 32 a bell crank including short arm 33 and a longer arm 34 which constitutes an operating handle. A link 35, 35a is pivotally connected by means of a pin 36 to the elbow portion of mentioned bell crank and, at its right end, is connected by means of a pintle 37 to a cam disk 38 near the rightward periphery thereof. Disk 38 is rigid with a stub shaft 39 which extends inwardly into a gear box and motor, generally designated 40. Motor operating wires are indicated at 41, 42a, and 42b.

This gin front operating mechanism is more fully described in Day Patent 2,962,769, issued December 6, 1960. As there explained, energization of motor 40 causes rotation of cam disk 38 and leftward actuation of link 35 through eccentric pintle 37. This, in turn, rotates bell crank 33, 34 about pivot 32 and also rotates the gin front 11 to the dot-dash line position shown in which the feed chute 13 is separated from the gin saw teeth so that ginning cannot occur. Further energization of motor 40 draws linkage 35 rightwardly to return the gin front to its operating position.

In the operating position of the mechanism, a latching collar 45 on link 35 engages a camming element (not shown) on disk 38 and thereby is slightly shifted relative to the leftward portion 35 of the linkage so as to unlatch the rightward portion 35a thereof and permit telescoping of the link parts. Accordingly, it is possible to manually open the gin front through actuation of bell crank handle 34 without operation of motor 40.

The gin stand is operated by a motor 49 through belting 50 leading to gin saw shaft 7. The other operating parts of the gin stand as well as the feeder 24 are operated from the same motor as through suitable belting shown in part at 51 and 51a.

Figure 3:
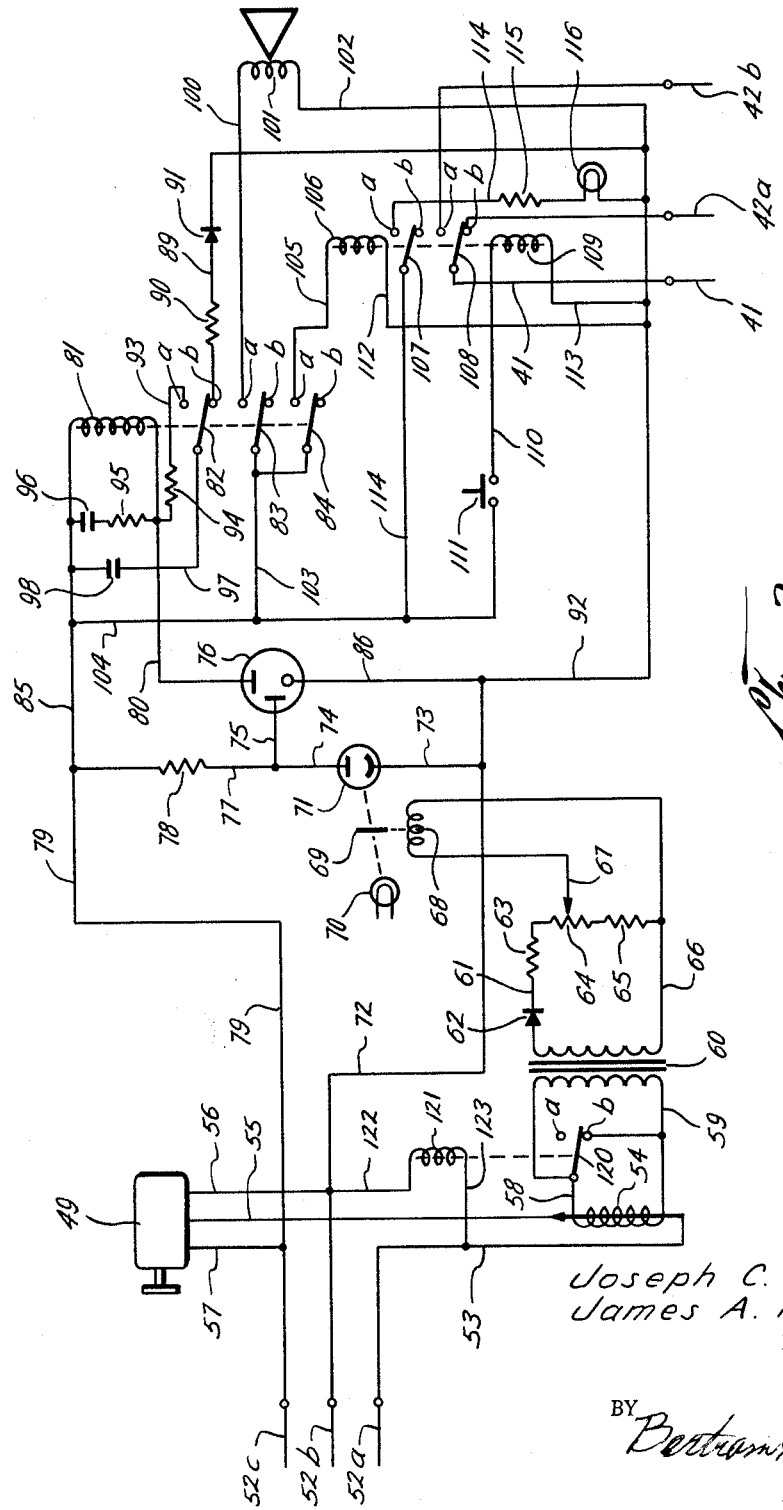
FIG. 3 is a wiring diagram of the control mechanism.

FIG. 3 is a wiring diagram illustrating the mechanism for automatically opening the gin front responsive to an overload applied to main driving motor 49 and for manually returning the gin front to its operating position. The three-phase power supply for the operating motor is represented at 52a, 52b and 52c. One of the power legs 52a is led, as at 53, through a current transformer 54, thence is connected by a wire 55 to the motor 49. The other power legs are also connected by wires 56 and 57 to the motor. The current induced in the coil of transformer 54 is led by means of wires 58 and 59 through the primary coil of a voltage transformer 60. The secondary of transformer 60 is connected by a wire 61, leading through a rectifying diode 62 and resistance 63 to a potentiometer 64, thence through resistance 65 and wire 66 back to the secondary.

The variable lead 67 from the potentiometer is connected to the coil 68 of a shading relay, including a beam obstructing or shading pointer 69. A light source 70 is aimed to cast a beam against a photoelectric cell 71, but the beam may be intercepted by shading pointer 69, as will be explained. Cell 71, conventionally represented, is of the type to incorporate greater electrical resistance when shaded than when illuminated. Another leg 52b of the power circuit is connected by wires 72 and 73 to photoelectric cell 71, thence by wires 74 and 75 to the control grid of a gas control tube 76 and by means of a wire 77, including a resistor 78, to a lead 79 connected to the third leg 52c of the power source.

The plate of tube 76 is connected by a wire 80 to one side of the actuating coil 81 of a relay having three pole contacts 82, 83 and 84. For convenience, the upper contacts of each set are designated a and the lower contacts b. The other side of relay coil 81 is connected by a wire 85 and wire 79 to power leg 52c. The cathode of tube 76 is connected by wires 86 and 72 to middle power lead 52b.

Relay contact 82b, which is normally closed, is connected by means of a wire 89, through a limiting resistor 90 and rectifying diode 91 to a wire 92, thence by wire 72 to power lead 52b. Normally open relay contact 82a is connected by a wire 93, a resistor 94, and wire 80 to one side of relay coil 81. A chatter preventing circuit including a resistor 95 and condenser 96 parallels coil 81. Relay pole 82 is connected by a wire 97 and a condenser 98 to power lead 85.

Intermediate, normally open relay contact 83a is connected by a wire 100 to a horn 101 for giving an audible signal when the gin front is opened, as will be explained. The other terminal of the horn is connected by a wire 102 to power lead 92. Relay pole 83 is connected by wires 103 and 104 to power lead 85.

The third normally open relay contact 84a is connected by a wire 105 to one actuating coil 106 of a latching relay having two poles 107 and 108. The relay contacts, as before, are designated, respectively, a and b. This relay is provided with an additional actuating coil designated 109. One side of coil 109 is connected by a wire 110 through a manual switch 111 to power line lead 85. The other sides of both coils 106 and 109 are connected, respectively, by wires 112 and 113 to power line lead 92.

Relay contact 107a is connected by a wire 114 through a resistor 115 and a signal lamp 116 to power line lead 92. Pole 107 is connected by a wire 114 to power lead 85. Relay contacts 108a and 108b are connected, respectively, by directional wires 42b and 42a to motor 40 for actuating the gin front. The common wire 41 for motor 40 is connected to relay pole 108.

The above described mechanism provides for automatically shifting the gin front to its open or inoperative position responsive to the subjecting of main drive motor 49 to an overload, as will be explained. However, means must be provided to prevent such shifting of the gin front upon starting of the motor 49 when a very high amperage will be drawn, temporarily. Such means comprises a shorting switch 120, constituting the pole of a timed relay having an actuating coil 121 and relay contacts 120a and 120b. Relay coil 121 is connected by wires 122 and 123 across power leads 52a and 52b. Thus, when motor 49 is initially subjected to starting load, coil 121 will be energized and wires 58 and 59 leading to voltage transformer 60 will be shorted through relay contact 120b. Relay 121, with pole 120 is of the type to automatically return its pole to contact 120a after an interval sufficient to permit motor 49 to accelerate to normal speed.

In operation, gin stand driving motor 49 normally produces from 25 to 60 H.P., depending on the type of gin and feeder used and is energized from a 440 volt, 3 phase line. The energization of motor 49 in order to place the gin and feeder in operation will, as explained, temporarily short out the automatic control features. After a predetermined time interval, switch pole 120 is shifted to contact 120a and the automatic control circuitry is energized. Potentiometer 64 will be adjusted so that shading pointer 69 will not interfere with the beam from lamp 70 under normal or optimum operating conditions. The resistance of photoelectric cell 71, when illuminated, is such that the control grid of tube 76 will not be sufficiently positive to permit the tube to conduct.

Now, in case motor 49 should be subjected to an overload, the increased current drawn by the motor would be reflected in the inductive element of current relay 54 and the resultant signal transformed at 60 and rectified by diode 62 causes deflection of shading pointer 69 sufficiently to interrupt the beam from lamp 70. This, in turn, increases the resistance of cell 71, which increases the positive voltage of the grid of tube 76 with respect to the cathode which causes the tube to conduct. The current pulses supplied from the tube plate through wire 80 energize relay coil 81, and relay pole 82 will shift to normally open contact 82a. Condenser 98, previously charged through normally closed relay contact 82b and rectifier 91, now discharges so as to maintain relay 81 picked up momentarily and cause horn 101 to blow. The horn is energized by middle contact 83a of the relay. At the same time, energization of normally open relay contact 84a energizes latching relay coil 106 which, through relay contact 107a, illuminates signal lamp 116 to indicate that the particular gin front is opened, where automatic mechanism is provided, or that the operator should open the designated gin front by actuation of arm 34. At the same time, relay pole 108 connects to its contact 108a to interconnect common power wire 41 to lead 42b which operates motor 40 and cam disk 38 in the direction to open the gin front 11. Motor 40 develops only about ⅓ H.P. and may be energized from a 110 volt power circuit. This relay then remains latched in this position. After the blocking in the gin roll or other malfunction is corrected, the operator depresses switch button 111 which energizes relay coil 109 to shift the latching relay contact. Lamp 116 is extinguished and power common 41 is connected through relay contact 108b to lead 42a for rotating motor 40 and cam disk 38 in the direction for closing the gin front so as to resume the feeding of cotton to the gin stand.

Accordingly, the operator is apprised of the location of any malfunction, such as excess roll density, bearing failure, or any other cause of motor overloading, so that corrective steps can be taken immediately. Preferably, the gin front will be automatically opened upon the occurrence of any malfunction.

The invention may be modified in various respects as will occur to those skilled in the art, and the exclusive use of all modifications as come within the scope of the appended claims is contemplated.

We claim:

1. The combination with a cotton gin having a movable breast, a seed roll chamber, and a saw cylinder with saw teeth movable through said chamber to cause rotation of the seed roll therein, of means to selectively shift said breast to operative and inoperative positions, electric motor means for powering said saw cylinder, means sensitive to an increase in current flow through said motor means due to abnormal loads thereon such as abnormal compaction of the seed roll against said teeth to actuate said first-mentioned means to a position to render said gin inoperative, locking means for locking said first-mentioned means in said position, and manual means to unlock said locking means.

2. The combination with a cotton gin having a seed roll chamber, a saw cylinder with saw teeth passing through said chamber to cause the rotation of the seed roll therein, a main operating motor for said cylinder, a powering circuit for said motor, and a breast movable to operative and inoperative positions, of an actuating motor for said breast, an energizing circuit for said actuating motor, relay means in control of said energizing circuit, and a circuit in control of said relay means and including a current transformer coupled to said main motor powering circuit and including an element for actuating said relay means responsive to increase in current flow in said main powering circuit due to abnormal load conditions on said motor such as abnormal density of the seed roll to energize said second motor and thereby shift said gin breast to its inoperative position.

3. The combination described in claim 2 further including means for latching said relay means in its actuated position and additional means including a manual control for unlatching said relay means at the will of an operator.

References Cited by the Examiner

UNITED STATES PATENTS

| | | | |
|---|---|---|---|
| 2,529,729 | 11/50 | Hanson | 324—110 |
| 2,761,178 | 9/56 | Van Doorn et al. | 19—55 X |
| 2,769,208 | 11/56 | Deems | 19—55 |
| 2,846,633 | 8/58 | Gingrich | 317—13 X |
| 2,947,875 | 8/60 | Beck | 317—130 X |
| 2,962,769 | 12/60 | Day | 19—55 |
| 3,032,830 | 5/62 | Van Doorn et al. | 19—55 X |
| 3,066,246 | 11/62 | Glauber | 317—130 X |

DONALD W. PARKER, *Primary Examiner.*

MERVIN STEIN, *Examiner.*